UNITED STATES PATENT OFFICE.

EMIL FISCHER, OF BERLIN, GERMANY, ASSIGNOR TO C. F. BOEHRINGER & SOEHNE, OF WALDHOF, GERMANY.

OXYPURIN AND PROCESS OF MAKING SAME.

SPECIFICATION forming part of Letters Patent No. 631,709, dated August 22, 1899.

Application filed January 31, 1898. Serial No. 668,647. (Specimens.)

*To all whom it may concern:*

Be it known that I, EMIL FISCHER, a citizen of the Empire of Germany, residing at Berlin, in the Empire of Germany, have invented certain new and useful Improvements in the Manufacture of Oxypurins and their Derivatives; and I do hereby declare the following to be a full, clear, and exact description of the invention, such as will enable others skilled in the art to which it appertains to make and use the same.

The present invention relates to the preparation of oxy-purins and their alkyl derivatives, and particularly the production of a series of bodies starting from trichloropurin, a compound which is described in Letters Patent of the United States No. 598,502, dated February 8, 1898.

The present invention has for its specific object the preparation of hypoxanthin and involves also the preparation of the intermediate new body 6-oxy-2-8-dichloropurin, which is a derivative of trichloropurin.

Before proceeding with the description it should be stated that the nomenclature herein followed is that adopted by the article published in *Berichte der Deutschen Chemischen Gesellschaft*, Vol. 30, page 549. According to this nomenclature a large number of bodies, such as caffein, uric acid, guanin adenin, &c., are designated by the generic term "purins" and their nucleus. The "purin group" has its several carbon and nitrogen atoms numbered in the following manner:

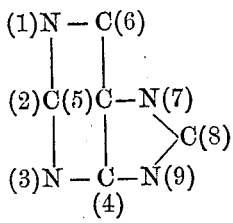

Bearing this nomenclature and system of numbering the position of the atoms in mind the use of terms in the following description will be readily understood. Thus, for example, the compound hypoxanthin, which may be obtained synthetically by the application of my invention, is styled 6-oxy-purin under the new nomenclature, since it has the structural formula:

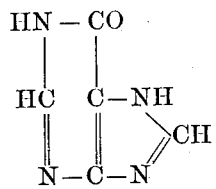

For the purpose of outlining my invention I will state that when acting upon trichloropurin with alcoholic alkali at ordinary room-temperature the former is converted into 6-ethoxy-2-8-dichloropurin or 6-methoxy-2-8-dichloropurin (according as ethyl or methyl alcohol is used) having the formula:

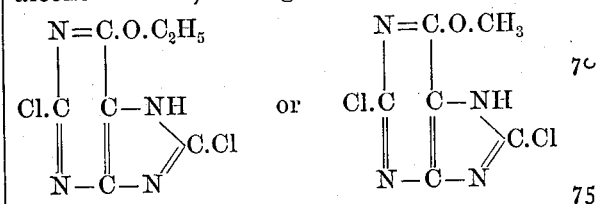

When either of the latter is heated with hydrochloric acid, it loses the ethyl or methyl group, giving rise to 6-oxy-2-8-dichloropurin having the formula:

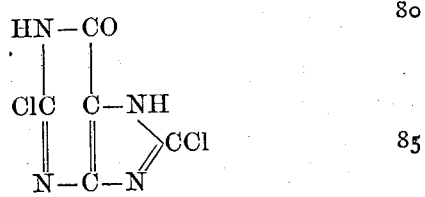

the latter being in turn by reducing agents converted into 6-oxypurin:

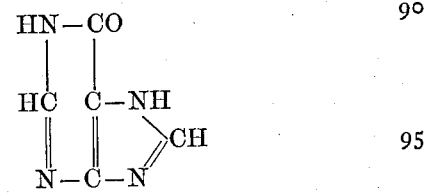

which has been shown to be identical with natural hypoxanthin. This splitting off of ethyl and the substitution of hydrogen for the chlorin atoms may also be accomplished directly in one operation by treating the 6-ethoxy-2-8-dichloropurin with hydriodic acid, in which case hypoxanthin is also obtained.

The intermediate compound 6-oxy-2-8-dichloropurin may also be obtained directly from trichloropurin by substituting aqueous for the alcoholic alkali above and heating the mixture. The chlorin atom is in this manner readily displaced by a hydroxyl group.

It will thus be seen that my invention, broadly considered, consists in the preparation of 6-oxy-2-8-dichloropurin or 6-alkyl-oxy-2-8-dichloropurin by acting on trichloropurin with an alkali or an alcoholic alkali. My invention also consists in the new compound 6-oxy-2-8-dichloropurin and the method of preparing hypoxanthin from a 2-8-dichloro-6-oxy-purin having an alkyl radical combined with the oxygen or from the same.

My invention also comprises such other features and methods as will be hereinafter set forth and pointed out in the claims.

The 2-8-dichloro-6-alkyl-oxy-purin, which constitutes a link in the chain of manufacture of hypoxanthin under one modification of my invention, while herein described to fully disclose my invention, is not herein claimed, however, being the subject-matter of my application, Serial No. 668,648, filed concurrently herewith, nor is the specific method of its manufacture herein covered by claim, since that also is a part of the said concurrent application.

In the following detailed description I will first describe the preparation of 6-oxy-2-8-dichloropurin by proceeding either from the dichloro-alkyl-oxypurin or from trichloropurin and then the preparation of the hypoxanthin from a dichloro-oxypurin without or with an alkyl group bound to the oxygen in the position 6.

1. Preparation of 2-8-Dichloro-6-Ethoxy-Purin.

Four parts dry trichloropurin whose properties and mode of preparation are set forth in my aforesaid patent, No. 598,502, dissolved in sixteen parts of alcohol, and this solution after being rapidly cooled to about 10° to 15° centigrade, and which, as a rule, has a tendency to throw out crystals of the trichloropurin, is added to a solution of one and two-tenths parts of sodium in twenty-four parts of alcohol cooled to room-temperature. A clear pale-yellow liquid results, which is spontaneously heated to about 30° centigrade, and soon becomes turbid by reason of a precipitation of sodium-chlorid. The mixture is allowed to stand at ordinary temperature for three hours, whereupon fifty parts of water are added and the whole is supersaturated slightly with acetic acid. The alcohol is then evaporated off, whereby the dichloro-ethoxy-purin is precipitated in colorless very flexible acicular crystals. The same is then purified by recrystallization from hot benzene. Its formula is $C_7H_6Cl_2N_4O$ or

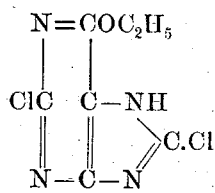

It trickles at about 190° centigrade and melts completely at about 200° centigrade, the fusion being accompanied by decomposition. It is soluble only with difficulty in hot water, but dissolves readily in hot alcohol and aceton.

The above converting process proceeds according to the equation:

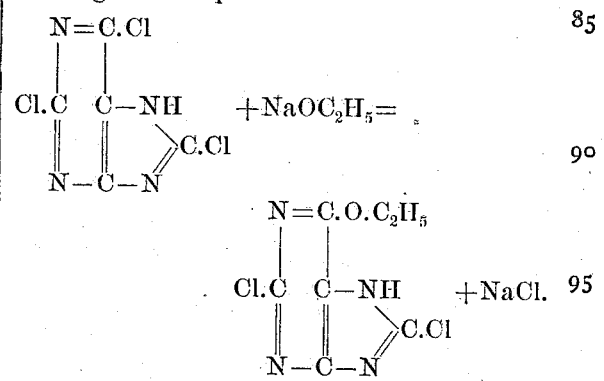

2. Preparation of 2-8-Dichloro-6-Methoxy-Purin.

If in the place of the ethyl-alcoholic solution a methyl-alcoholic solution of sodium is employed, the other ingredients and conditions of the above process remaining the same, I obtain 2-8-dichloro-6-methoxy-purin, which melts and decomposes at about 225° centigrade and which is considerably less soluble in benzene than the ethoxy compound.

The generic formula for both of the oxyalkyl-dichloro-purins is:

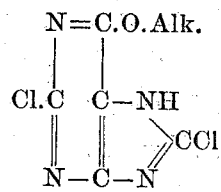

3. Preparation of 6-oxy-2-8-Dichloro-Purin.

*Process a.*—The 2-8-dichloro-6-ethoxy-purin described under example 1 may be converted into the new compound 6-oxy-2-8-dichloro-purin by a mineral acid, preferably a haloid acid. I find the following to be the best manner to carry out this process: I mix powdered 2-8-dichloro-6-ethoxy-purin with five times its weight of fuming hydrochloric acid and heat the mixture on the water-bath.
Solution rapidly takes place, and the difficultly-soluble 6-oxy-2-8-dichloro-purin is soon thrown out in the form of coarse crystals. The conversion will be completed in about a half-hour, after which the whole is diluted with about ten parts of water and allowed to cool, after which the mother-liquor is separated from the crystals by filtration.

For the purpose of complete purification the new body is converted into the potassium salt, which is completely decolorized by recrystallization from hot water, to which some animal charcoal is added. The oxy-dichloropurin when recovered from the potassium salt forms beautiful colorless acicular crystals having the formula $C_5N_4H_2Cl_2O$ or

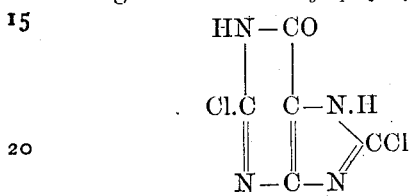

When heated to over 350°, it decomposes and turns brown. It dissolves with considerable difficulty even in hot water. It is more soluble in hot alcohol. Its aqueous solution has an acid reaction and decomposes carbonates. Its barium salt crystallizes from a hot solution of the same in excess of baryta water in fine needles usually aggregated into fasces or bunches.

Upon adding nitrate of silver to an ammoniacal solution of the purin it forms a colorless amorphous precipitate.

The above process is explained in the following equation:

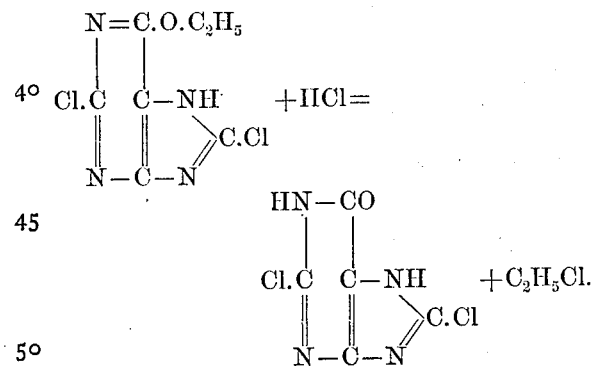

*Process b.*—The 6-oxy-2-8-dichloro purin may be obtained directly from the trichloropurin by substituting aqueous for alcoholic alkali in example 1 and heating the mixture. The chlorin atom is in this manner readily replaced by the hydroxyl group. The following detailed description discloses what I consider the preferred method of carrying out this modification. An amount of trichloropurin is dissolved in sufficient potash lye to make the amount of alkali correspond to three molecules. The liquid is then heated to 100° centigrade and maintained at this temperature for three hours. The same thus acquires a pale-pink color. The solution is then supersaturated with hydrochloric acid, whereby the 6-oxy-2-8-dichloropurin is thrown out in the form of fine reddish acicular crystals. The further purification is carried out in the manner set forth under "Process a."

The above process is explained in the following equation:

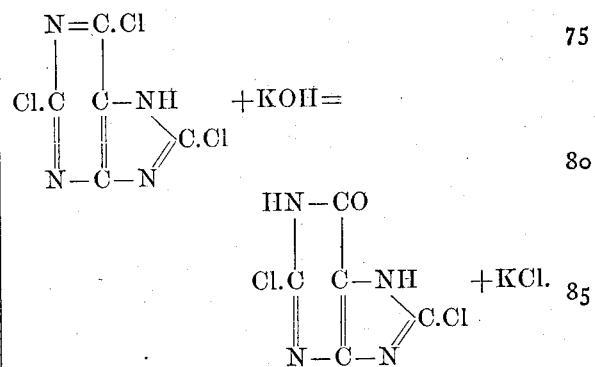

4. *Preparation of Hypoxanthins.*

(*a.*) *Preparation of hypoxanthin from 6-oxy-2-8-dichloro-purin.*—One part of the finely-powdered oxydichloropurin is added to ten parts hydrogen iodid or hydriodic acid of the specific gravity 1.96 and after about one-half part of phosphonium iodid or yellow phosphorus has been added the whole is first shaken for about an hour at ordinary temperature and then heated on the water-bath until an almost colorless solution is formed. On cooling the hydro-iodate of hypoxanthin is thrown out in the form of beautiful crystals. The entire quantity of this product is obtained by evaporating the hydrogen iodid. The reaction takes place according to the equation:

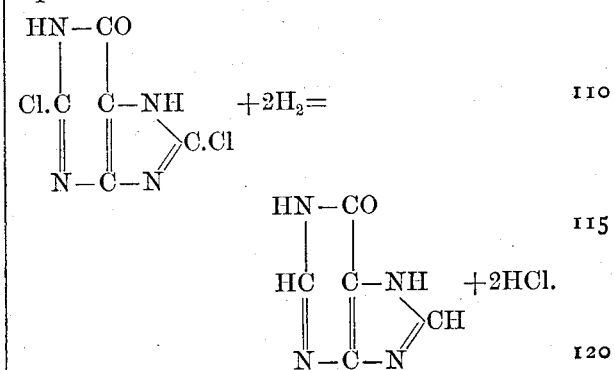

After forming a concentrated aqueous solution of the hydro-iodate, the hypoxanthin may be obtained therefrom by neutralizing with ammonia. The product thus obtained is purified by recrystallizing from hot water, animal charcoal being added. The artificial compound thus prepared unites all the properties of natural hypoxanthin or 6-oxy-purin.

(*b.*) *Preparation of hypoxanthin from 2-8-dichloro-6-ethoxypurin.*—If in place of the simple oxy-dichloropurin, we employ the ethylized product, the 2-8-dichloro-6-ethoxy-purin, in the process under (a), all other conditions remaining the same, the said ethylized oxy-dichloropurin will lose not only its two chlorin atoms, but also the ethyl radical—that is to say, hypoxanthin or 6-oxy-purin will again result.

What I claim, and desire to secure by Letters Patent of the United States, is—

1. The process which consists in treating a 2-8-dichloro-6-alkyl-oxy-purin with a mineral acid to remove the alkyl group.

2. The process which consists in mixing 2-8-dichloro-6-ethoxy-purin with fuming hydrochloric acid and heating the mixture.

3. The process which consists in mixing 2-8-dichloro-6-ethoxy-purin with fuming hydrochloric acid and heating the mixture, then diluting with water and allowing to cool, then filtering and converting the residue into the potassium salt, recrystallizing from hot water with animal charcoal and recovering the oxy-dichloropurin.

4. As a new chemical compound, 6-oxy-2-8-dichloro-purin which has the formula above given, which is soluble only with difficulty in water, but more soluble in alcohol, whose aqueous solution has an acid reaction, which decomposes and turns brown when heated to over 350°, centigrade, and which may be obtained in the form of colorless crystals.

5. The process of preparing hypoxanthin which consists in submitting a 2-8-dichloro-6-oxy-purin to a reducing agent.

6. The process of preparing hypoxanthin which consists in submitting 2-8-dichloro-6-oxy-purin to the action of hydriodic acid and phosphonium iodid.

7. The process which consists in adding 6-oxy-2-8-dichloropurin to hydriodic acid and phosphonium iodid, shaking the whole at ordinary temperature and then heating and then cooling and filtering the crystals of hydro-iodate of hypoxanthin, dissolving the same in water and neutralizing with ammonia to thus obtain free hypoxanthin.

8. The process which consists in converting 2-8-dichloro-6-alkyl-oxy-purin into a dichloro-oxy-purin free from alkyl, by treating the former with hydrochloric acid and then submitting the resultant product to a reducing agent.

9. The process which consists in treating 2-8-dichloro-6-alkyl-oxy-purin with hydrochloric acid and then submitting the resultant 2-8-dichloro-6-oxy-purin to hydrogen iodid and phosphonium iodid, all substantially as set forth.

In testimony whereof I affix my signature in presence of two witnesses.

EMIL FISCHER.

Witnesses:
CHAS. H. DAY,
HENRY HASPER.